April 5, 1927.
A. H. WARREN, JR
POWER TAKE-OFF DEVICE
Filed April 2, 1925
1,623,765
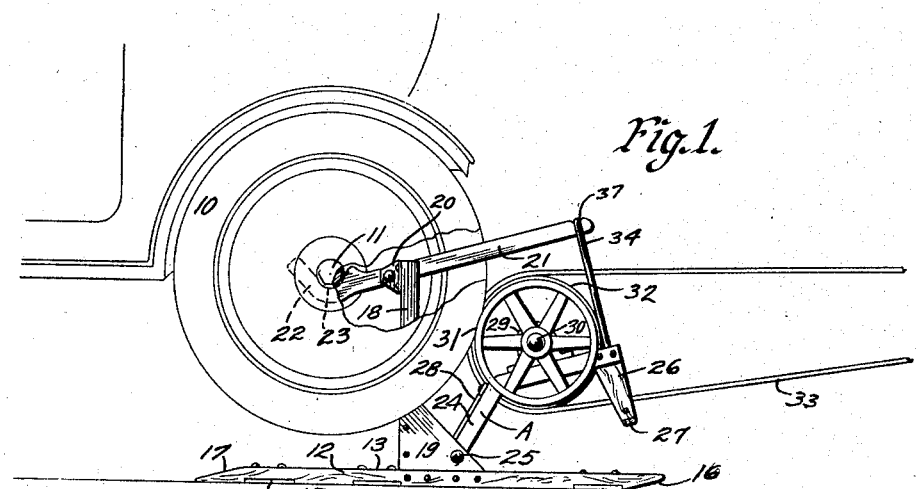
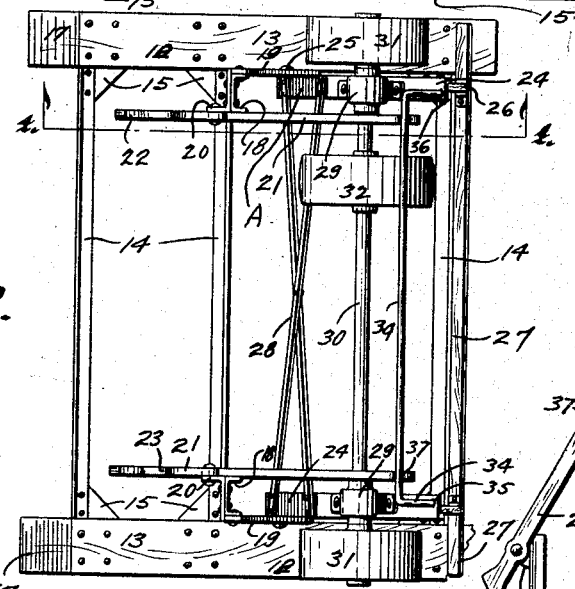
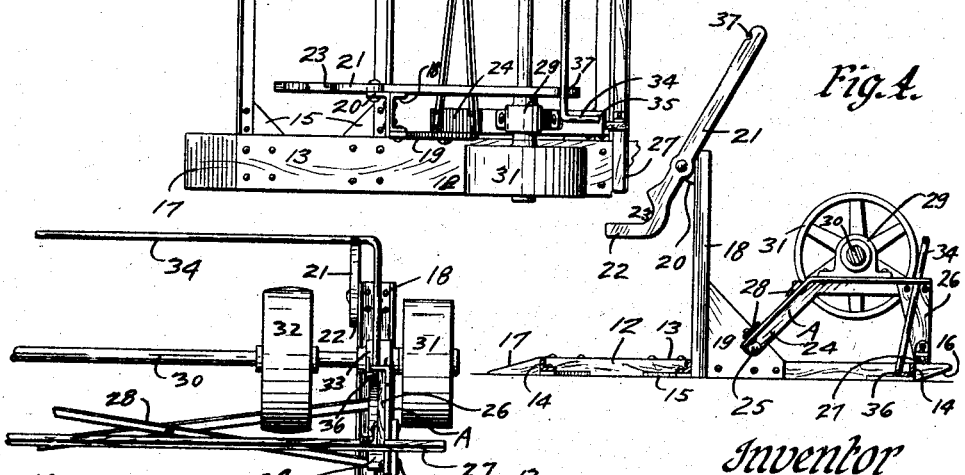
Inventor
Alvah H. Warren jr.
by Bair & Freeman Attorneys Patented Apr. 5, 1927.

1,623,765

UNITED STATES PATENT OFFICE.

ALVAH H. WARREN, JR., OF ST. PAUL, MINNESOTA.

POWER TAKE-OFF DEVICE.

Application filed April 2, 1925. Serial No. 20,081.

The object of my invention is to provide a simple device, wherein power may be transmitted from an ordinary automobile, to a pulley for operating any implement or device ordinarily operated by gas engines or electric motors.

Still a further object is to provide a device adapted to be driven from the drive or rear wheels of an automobile by elevating the rear end of the automobile, and supporting it in position where its own weight will tend to insure a positive connection between the drive wheels on the power take off device and the automobile wheels.

Still a further object is to provide a frame having automobile wheel receiving platforms, and a lever connection for elevating the rear end of an automobile, and means for supporting the automobile in raised position where the rear wheels will engage and drive a pair of wheels mounted on a power shaft.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a side elevation of my improved take off device, showing the rear end of an automobile in raised position in engagement therewith.

Figure 2 is a top plan view of my improved device.

Figure 3 is an end view of a portion of the device; and

Figure 4 is a sectional view taken on line 4—4 of Figure 1.

In the accompanying drawings, I have used the reference numeral 10 to indicate generally the rear wheels of an automobile, and 11 to indicate the axle housing construction of the automobile.

My improved device comprises a frame 12, which includes a pair of spaced wheel receiving platforms 13. The members 13 are connected together by a number of connecting bearings 14, which are braced by angular brace pieces 15. The brace pieces 15 are riveted or bolted to the members 13.

The members 13 have one of their ends inclined or beveled, as at 16, so as to form a runner for permitting the entire frame and the parts thereon, as will hereinafter be more fully described, to be drawn over the ground in sled fashion.

The members 13 are spaced a sufficient distance apart so that the upper surface may receive the two rear wheels of an automobile.

The end of the members 13, opposite the beveled end 16, is beveled in the opposite direction, as at 17, so as to permit the automobile wheels 10 to easily run onto the members 13, which may be called wheel receiving platforms.

Secured to one side of the cross bars 14 are a pair of channel shaped uprights 18. The uprights 18 are braced to the members 13 by angle plate braces 19, as clearly shown in Figure 1 of the drawings.

Secured to the upper ends of the uprights 18 are the bearing brackets 20.

Pivoted to each of the bearing brackets 20 is a lever 21.

The levers 21 are formed with an offset extension 22, which is adapted to rest in position below the axle 11 of the automobile before the automobile is moved to raised position.

The position of the lever 21 for receiving the axle of the automobile is clearly shown in Figure 4 of the drawings.

The levers 21 are notched, as at 23, so as to form a receiving pocket for the axle 11 when the levers are moved to their raised position, as shown in Figure 1 of the drawings.

The levers are so positioned as to engage the axle 11 just inward of the rear wheels 10 of the automobile. The levers 20 are of sufficient length so as to give a pretty good leverage for permitting the rear end of the automobile to be raised upward.

Mounted on the brace plates 19 is a swinging frame A, which I will now describe in detail.

The swinging frame A comprises a pair of angle shaped arms 24 pivoted to the brace plates 19 by means of the pivots 25.

The arms 24 have an inclined portion and a substantial horizontal portion, when the parts are in position shown in Figure 4 of the drawings.

Fixed to the free ends of the arms 24 are the legs 26. The legs 26 on each arm 24 are connected together by a cross bar 27, which when the swinging frame A is in lowered position, will rest upon the members 13.

The two arms 24 are connected together so as to swing in unison as a complete frame by means of a pair of diagonally arranged braces 28.

Mounted upon the horizontal portion of the arms 24 are the bearings 29, having journalled therein a transverse shaft 30. The shaft 30 has its ends extended beyond the frame A and on these ends are fixed wheels 31.

The wheels 31 are designed to engage the tread of the automobile wheels 10, as will hereinafter be more fully set forth.

Fixed to the shaft 30 between the two arms 24 of the frame A is a drive pulley 32 around which may be extended a belt 33 for driving any suitable structure.

In order to connect the swinging frame A so that the shaft 30 thereon is operated, I provide a rod 34 which has its ends downturned, so as to form a substantial yoke. The downturned ends extend through openings 35 formed in the arms 24, and are held against removal by the extensions 36 formed on the lower ends of the downturned portions of the rod 34.

The rod 34 is capable of movement within the openings 35 for permitting the same to be moved to position, as shown in Figure 4 of the drawings.

The levers 21 each have a notch 37 therein for receiving the rod 34.

The rod 34 connects the frame A to the levers 21 in such manner that the wheels 31 on the frame A will engage the automobile wheels 10.

*Practical operation.*

In the practical operation of my power take off device, I back the automobile rear wheels on to the members 13.

The notch 23 in the levers 21 is positioned so as to engage the axle 11 of the automobile.

The levers 21 are then engaged for swinging or raising the automobile rear end up off the members 13. The swinging frame A is raised by engagement of the rod 34, and when the rod 34 extends into the notches 37 in the levers 21, it will cause the wheels 31 to engage with the automobile wheels 10, as clearly shown in Figure 1 of the drawing.

The weight of the rear end of the automobile tends to pull the swinging frame A, and the wheels 31 thereon against the wheels 10.

The heavier the down pull on the rear end of the automobile, the greater the frictional engagement between the automobile wheels 10 and the wheels 31.

When the automobile engine is started and power is applied to the back wheels of the automobile, that will cause the wheels 31 and the shaft 30 to be rotated for driving the pulley 32.

The speed of rotation of the shaft 30 may be varied according to the speed of rotation of the wheels 10.

The power take off device may be easily connected with the automobile for operation or may be easily disconnected therefrom.

One of the advantages of my structure resides in the fact that no change in construction or attachments are necessary to be fixed to the automobile, in the operation of the power take off device.

Some changes may be made in the construction and arrangement of the various parts of my invention, without departing from the real spirit and purpose of my invention, and it is my intention to cover by my claims, any modified forms of structure or use of mechanical equivalents, which may be reasonably included within their scope.

I claim as my invention:

1. A power take off device comprising a main frame having automobile wheel receiving platforms, means for engaging and supporting the rear axle of an automobile in position with the wheels above the ground, a swinging frame pivoted to said main frame and having pulleys thereon for engagement with the wheels of the automobile and means for connecting said first means with the swinging frame whereby the weight of the auto will maintain said pulleys in contact with the wheels on the auto and rotation of said wheels will impart rotation to the pulleys on said swinging frame.

2. A power take off device comprising a main frame, means for engaging and supporting the rear end of an automobile in elevated position thereon, said means comprising a lever for engagement with the automobile, said lever being pivoted to said main frame, a swinging frame mounted on said main frame, a rod connected to the swinging frame and adapted to extend over the lever for maintaining the lever and swinging frame in a predetermined position relative to each other and means supported on said swinging frame adapted to engage the rear wheels of the automobile whereby rotation of the automobile wheels will operate the power take off as and for the purposes stated.

3. A power take off device comprising a main frame, means pivoted thereon for engaging and supporting the rear end of an automobile in elevated position, said means comprising a lever for engagement with the automobile, a swinging frame pivoted to said main frame, a rod connected to said swinging frame for extending over the lever for maintaining the lever in a predetermined position, pulleys mounted on said swinging frame adapted to engage the wheel of the automobile, the parts being so arranged that the weight of the automobile insures engagement of the automobile wheels with said last wheels as and for the purposes stated.

4. A power take off device comprising a main frame, means for engaging and supporting the rear end of an automobile in elevated position, said means comprising a lever for engagement with the automobile a swinging frame pivoted on said main frame, a rod connected to the swinging frame for extending over the lever for maintaining the lever in a predetermined positon, pulleys mounted on said swinging frame adapted to engage the wheels of the automobile, a shaft for said pulleys journalled on said swinging frame, a belt pulley on said shaft, the parts being so arranged that the weight of the automobile insures engagement of the automobile wheels with said pulleys as and for the purposes stated.

5. A device of the class described comprising a main frame having a lever pivoted thereon, means on said lever for engaging the axle of an automobile, a swinging frame pivoted to said main frame, a shaft journalled thereon having pulleys thereon, a rod for connecting said swinging frame and said lever together whereby the weight of the automobile on said lever will swing said swinging frame toward the wheels of said automobile for maintaining said pulleys in contact with the wheels of said automobile.

6. The combination with the rear axle housing of an automobile, a base disposed beneath said housing upwardly extending arms carried by said base, axle housing engaging levers pivoted to said upwardly extending arms and forming means whereby said housing may be jacked upwardly, of levers pivotally connected to the base and extending upwardly and rearwardly, a transversely disposed shaft carried by said upwardly and rearwardly extending levers, detachable link connections between the rear ends of said last named levers and the rear ends of the first named levers and forming means whereby the weight of the automobile will force the transversely disposed shaft towards the wheels of the automobile and means carried by the transversely disposed shaft whereby power may be transmitted to auxiliary machinery.

7. A power attachment for automobiles comprising a base adapted to be disposed beneath the rear axle housing of the automobile drive wheels at opposite ends of said housing upwardly extending arms carried by said base, horizontally disposed levers pivoted to the upwardly extending arms, means carried by one end of said levers for receiving the axle housing, levers pivoted to the base and extending upwardly and rearwardly, detachable link connections between the rear ends of all of the levers, a shaft extending transversely and carried by the upwardly and rearwardly extending levers, friction wheels carried by said shaft, said levers and link connections forming means whereby the weight of the automobile will force the friction wheels into close engagement with the automobile wheels.

ALVAH H. WARREN, Jr.